United States Patent
Melgar et al.

(10) Patent No.: US 11,055,687 B2
(45) Date of Patent: Jul. 6, 2021

(54) SMART STAGER

(71) Applicant: Moneygram International, Inc., Minneapolis, MN (US)

(72) Inventors: Paul Augusto Melgar, Eagan, MN (US); Scott Anthony Kostelecky, Maple Grove, MN (US); Cheryl Lynn Magers, Prior Lake, MN (US); Christian Michael Fuchs, Minneapolis, MN (US); Sonja Elizabeth Dery, Coon Rapids, MN (US); Joseph Richard Braga, Minneapolis, MN (US); David Allan Motley, St. Paul, MN (US); Gary Cecil Lugar, Maple Grove, MN (US); Constance Marie Arrington, Minneapolis, MN (US)

(73) Assignee: Moneygram International, Inc., Minneapolis, MN (US)

( * ) Notice: Subject to any disclaimer, the term of this patent is extended or adjusted under 35 U.S.C. 154(b) by 88 days.

(21) Appl. No.: 16/706,403

(22) Filed: Dec. 6, 2019

(65) Prior Publication Data

US 2020/0184449 A1 Jun. 11, 2020

Related U.S. Application Data

(63) Continuation of application No. 15/256,484, filed on Sep. 2, 2016, now Pat. No. 10,504,099.

(51) Int. Cl.
  *G06Q 40/00* (2012.01)
  *G06Q 20/22* (2012.01)
  *G06Q 20/10* (2012.01)

(52) U.S. Cl.
  CPC ............. *G06Q 20/29* (2013.01); *G06Q 20/10* (2013.01)

(58) Field of Classification Search
  CPC ................................ G06Q 20/29; G06Q 20/10
  See application file for complete search history.

(56) References Cited

U.S. PATENT DOCUMENTS

| 8,326,770 B1 | 12/2012 | Weisman |
| 9,129,464 B2 * | 9/2015 | Hansen ............. G06Q 20/3433 |

(Continued)

FOREIGN PATENT DOCUMENTS

| WO | WO-2005048152 A1 * | 5/2005 | ......... G06Q 30/0613 |
| WO | WO-2006004794 A2 * | 1/2006 | ............ G06Q 30/04 |

(Continued)

OTHER PUBLICATIONS

Alireza Beikverdi, InHwan Kim, JooSeok Song, "Centralized payment system using social networks account." 2014 IEEE Fourth International Conference on Big Data and Cloud Computing (Year: 2014).*

(Continued)

*Primary Examiner* — Alexander G Kalinowski
*Assistant Examiner* — William B. Bunker
(74) *Attorney, Agent, or Firm* — Norton Rose Fulbright US LLP

(57) ABSTRACT

Embodiments of the present disclosure provide a money transfer network system that improves the performance of money transfer services provided via the money transfer network system and improves the performance of the underlying devices utilized to provide money transfer services. In particular, disclosed embodiments of a money transfer network system provide money transfer services that enable multiple users to engage in money transfer transactions as either a sending party or a receiving party in a manner that is similar to money transfer transactions executed between two users individually. Disclosed embodiments further enable a receiving party to request payment from a sending (Continued)

party, which may include scheduling recurring payments to be made via money transfer transactions.

20 Claims, 6 Drawing Sheets

(56) References Cited

U.S. PATENT DOCUMENTS

| | | | |
|---|---|---|---|
| 9,466,051 B1 | 10/2016 | Roth et al. | |
| 9,978,052 B2 | 5/2018 | Zhao | |
| 2002/0087410 A1 | 7/2002 | Walker et al. | |
| 2004/0236660 A1* | 11/2004 | Thomas | G06Q 10/10 705/37 |
| 2010/0063924 A1* | 3/2010 | Hougland | G06Q 40/00 705/40 |
| 2011/0251922 A1* | 10/2011 | Cavagnaro | G06Q 20/405 705/26.41 |
| 2012/0143761 A1 | 6/2012 | Doran et al. | |
| 2012/0265678 A1 | 10/2012 | Ross et al. | |
| 2013/0166454 A1* | 6/2013 | Bulawa | G06Q 20/102 705/44 |
| 2013/0262139 A1* | 10/2013 | Salahuddin | G16H 10/60 705/3 |
| 2013/0297509 A1* | 11/2013 | Sebastian | G06Q 20/385 705/44 |
| 2014/0108268 A1 | 4/2014 | Miller et al. | |
| 2014/0156521 A1 | 6/2014 | Cozens et al. | |
| 2014/0279510 A1* | 9/2014 | Ebeling | G06Q 20/10 705/44 |
| 2014/0351130 A1 | 11/2014 | Cheek et al. | |
| 2014/0370972 A1 | 12/2014 | Mullen et al. | |
| 2015/0039499 A1* | 2/2015 | Christophersen | G06Q 20/02 705/40 |
| 2016/0125371 A1* | 5/2016 | Grassadonia | H04L 51/046 705/44 |
| 2017/0352019 A1* | 12/2017 | Li | G06Q 20/32 |
| 2018/0374073 A1* | 12/2018 | Zhao | G06Q 20/102 |

FOREIGN PATENT DOCUMENTS

| | | | | |
|---|---|---|---|---|
| WO | WO-2015/184353 A1 | 12/2015 | | |
| WO | WO-2015184353 A1 * | 12/2015 | | G06Q 20/326 |

OTHER PUBLICATIONS

Tewari et al., "Multiparty Micropayments for Ad Hoc Networks," NTRG, Dept. of Computer Science, Trinity College, Dublin, Ireland (Year: 2003).*

Beikverdi, A. et al., "Centralized payment system using social networks account," 2014 IEEE Fourth International Conference on Big Data and Cloud Computing, 2014 (Year: 2014).

* cited by examiner

SMART STAGER

CROSS-REFERENCE TO RELATED APPLICATIONS

The present application is a continuation of U.S. patent application Ser. No. 15/256,484 filed Sep. 2, 2016 and entitled, "SMART STAGER," the disclosure of which is incorporated by reference herein in its entirety.

TECHNICAL FIELD

The present application relates to techniques for providing money transfer services, and more particularly to improving money transfer networks and underlying devices for providing money transfer services.

BACKGROUND

Money transfer services enable a sending party to send an amount of funds to a receiving party. Typically, such money transfers are executed between two individuals, where the sending party provides an amount of funds to a money transfer service provider, and the money transfer service provider then transfers at last a portion of the amount of funds to the receiving party. Presently available money transfer services and systems are suitable for transferring funds between two individuals, but do not provide a convenient way for groups of two or more people to participate as a single party (e.g., as a receiving party and/or a sending party) to a money transfer transaction.

BRIEF SUMMARY

The present application discloses embodiments of a money transfer network system that improves the performance of money transfer services provided via the money transfer network system and improves the performance of the underlying devices utilized to provide money transfer services. In particular, disclosed embodiments of a money transfer network system provide money transfer services that enable multiple users (who may be at geographically disparate locations) to engage in money transfer transactions as either a sending party or a receiving party and be handled by various devices operating within the money transfer network system in a manner that is similar to money transfer transactions executed between two users individually. Disclosed embodiments further enable a receiving party to request payment from a sending party, which may include scheduling recurring payments to be made via money transfer transactions.

In accordance with one aspect, a method for providing a staged money transfer transaction service comprises receiving, by a first device, staging information for a money transfer transaction. The staging information may include: information that identifies at least two senders, information that identifies a receiving party, and a transaction amount. The method may further comprise determining, by the first device, an amount of funds received from the at least two senders to fund the money transfer transaction, where each of the at least two senders provides at least a portion of the funds. The method further comprises verifying, by the first device, whether the amount of the funds received from the at least two senders is greater than or equal to the transaction amount, and, in response to a verification that the amount of funds received from the at least two senders is greater than or equal to the transaction amount, initiating the money transfer transaction to provide at least a portion of the transaction amount to the receiving party.

In an additional aspect, a system configured to provide a staged money transfer transaction service is disclosed. The system comprises a database storing scheduling information associated with a recurring money transfer transaction. The scheduling information may identify a frequency for the recurring money transfer transaction, a due date for the recurring money transfer transaction, and a lead time for sending a notification to each of the at least two senders. The notification may request funding of the recurring money transfer transaction from at least two senders. The system further comprises an electronic device communicatively coupled to the database, where the electronic device comprises: a memory and at least one processor communicatively coupled to the memory. The at least one processor may be configured to receive the scheduling information and to store the scheduling information at the database. The at least one processor may further be configured to receive staging information for the recurring money transfer transaction. The staging information may include information that identifies at least two senders, information that identifies a receiving party, and information that identifies a transaction amount for the recurring money transfer transaction. In an aspect, the staging information may further include the scheduling information. The at least one processor may be further configured to detect receipt of funds from the at least two senders to fund the money transfer transaction, where each of the at least two senders provides at least a portion of the funds, and to verify whether the funds received from the at least two senders is greater than or equal to the transaction amount. In response to a verification that the funds received from the at least two senders is greater than or equal to the transaction amount, the at least one processor may be configured to initiate an instance of the recurring money transfer transaction to provide at least a portion of the transaction amount to the receiving party.

In yet another additional aspect, a non-transitory computer-readable storage medium stores instructions that, when executed by at least one processor, cause the at least one processor to perform operations for providing one or more money transfer transaction services to a user. The operations may include receiving staging information for a money transfer transaction. The staging information may include information that identifies at least two senders, information that identifies a receiving party, and a transaction amount. The operations may further include determining an amount of funds received from the at least two senders to fund the money transfer transaction, where each of the at least two senders provides at least a portion of the funds. The operations may also include verifying whether the amount of funds received from the at least two senders is greater than or equal to the transaction amount, and, in response to a verification that the amount of funds received from the at least two senders is greater than or equal to the transaction amount, initiating the money transfer transaction to provide at least a portion of the transaction amount to the receiving party.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
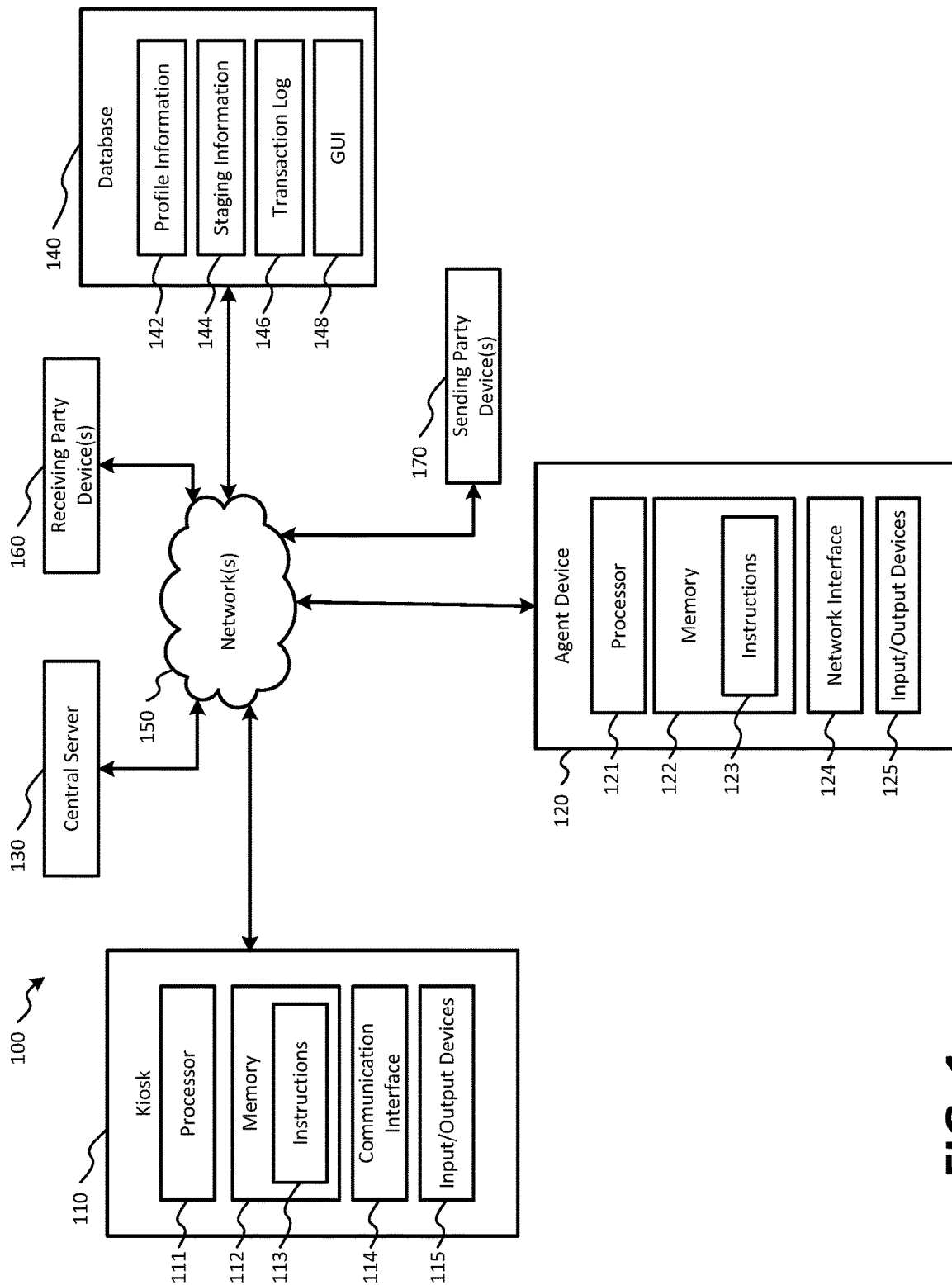
FIG. 1 is a block diagram illustrating an embodiment of a system architecture for a money transfer network configured to provide various types of money transfer transaction services.

Referring to FIG. 1, a block diagram illustrating an embodiment of a system architecture for a money transfer network configured to provide various types of money transfer transaction services is shown as a system 100. As shown in FIG. 1, the system 100 includes a kiosk 110, an agent device 120, a central server 130, a database 140, and a network 150. The network 150 may be configured to facilitate communication between various ones of the kiosk 110, the agent device 120, the central server 130, and the database 140, and may communicatively couple these devices of the system 100 to various third party devices, such as one or more receiving party devices 160, one or more sending party devices 170, and one or more other devices (not shown in FIG. 1), such as electronic devices associated with banks or other types of financial services entities. As described in more detail below, the system 100 may be configured to provide one or more types of money transfer transaction services to users.

The kiosk 110 includes one or more processors 111, a memory 112, a network interface 114, and one or more input/output (I/O) devices 115. The memory 112 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. In an embodiment, the memory 112 may store instructions 113 that, when executed by the one or more processors 111, cause the one or more processors 111 to perform operations for providing one or more travel services to a user, as described in more detail below with reference to FIGS. 1-6. The network interface 114 may communicatively couple the kiosk 110 to one or more networks, such as the network 150, to facilitate the exchange of information between the kiosk 110 and one or more of the other devices operating in the system 100, such as the agent device 120, the central server 130, the database 140, or a combination thereof. The network interface 114 may be configured to communicatively couple the kiosk 110 to the network 150 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). The I/O devices 115 may include a money order printer, a signature pad, a camera, a pin pad module, a financial card reader, a biometric input device or scanner, a receipt printer, another printing device, a barcode scanner, a metering device, a weight sensor, a check reader, a mouse, a keyboard, a touchscreen or other type of display device, a card scanner, a numeric keypad, a check reader, other types of input and output devices, or a combination thereof.

The agent device 120 includes one or more processors 121, a memory 122, a network interface 124, and one or more I/O devices 125. The memory 122 may include ROM devices, RAM devices, one or more HDDs, flash memory devices, SSDs, other devices configured to store data in a persistent or non-persistent state, or a combination of different memory devices. The memory 122 may store instructions 123 that, when executed by the one or more processors 121 cause the one or more processors 121 to perform operations for providing one or more travel services to a user, as described in more detail below with reference to FIGS. 1-6. The network interface 124 may be configured to communicatively couple the agent device 120 to one or more networks, such as the network 150, to facilitate the exchange of information between the agent device 120 and one or more of the other devices operating in the system 100, such as the kiosk 110, the central server 130, the database 140, or a combination thereof. The network interface 124 may be configured to communicatively couple the agent device 120 to the network 150 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). The I/O devices 125 may include a money order printer, a signature pad, a camera, a pin pad module, a financial card reader, a biometric input device or scanner, a receipt printer, another printing device, a barcode scanner, a metering device, a weight sensor, a check reader, a mouse, a keyboard, a touchscreen or other type of display device, a card scanner, a numeric keypad, a check reader, other types of input and output devices, or a combination thereof. In an embodiment, the agent device 120 may be a laptop computing device, a personal computing device, a tablet computing device, a point of sale (POS), a handheld POS, a smartphone, a mobile communication device, or another electronic device configured to perform the operations of the agent device 120, as described with reference to FIGS. 1-6.

Although not shown in FIG. 1, the central server 130 may be configured similarly to the configuration of the kiosk 110 and the agent device 120 as described above. For example, the central server 130 may include one or more processors, a memory (which may store instructions that, when executed by the one or more processors of the central server 130, cause the central server 130 to perform the operations described herein), a network interface, and one or more I/O devices. In an embodiment, the agent device 120 may be located at a brick and mortar location operated on behalf of an entity, such as a service provider, a retailer, a government agency, and the like. The entity may also operate the kiosk 110, the central server 130, and may maintain the database 140. In an embodiment, the entity may be a money transfer service provider. Additionally, one or more aspects of the present disclosure may be performed on a user's mobile device (not shown in FIG. 1), where the mobile device includes an application configured to perform operations in accordance with one or more embodiments of the present disclosure. The application may be created by the entity operating the various devices illustrated in FIG. 1, and may be made available for download to the mobile device via a website or online marketplace, such as the APP STORE® or GOOGLE PLAY®, and may facilitate operations to provide at least a portion of the various money transfer services to the user in accordance with the embodiments disclosed herein, as described in more detail below.

The database 140 may store various types of information that may be used by various devices (e.g., the kiosk 110, the agent device 120, and the central server 130) of the system 100 to provide money transfer transaction services to users in accordance with embodiments of the present disclosure. In an embodiment, the database 140 may be provided as a standalone database provided by a database server coupled to the kiosk 110, the agent device 120, and the central server 130 via the network(s) 150. In an additional or alternative embodiment, the database 140 may be stored at the memory of the central server 130, or a storage device coupled to the central server 130. As shown in FIG. 1, the database 140 may store profile information 142, staging information 144, a transaction log 146, and graphical user interface (GUI) information 148. The profile information 142 may include profile information associated with a plurality of user profiles. Each of the plurality of user profiles may be associated with a user or a group of users that have sent funds, received funds, or both, using the money transfer transaction services provided by the system 100, as described in more detail below. The staging information 144 may include information associated with one or more staged money transfer transactions, as described in more detail below.

The transaction log 146 may include entries for each money transfer transaction initiated using the system 100. For example, the transaction log 146 may include entries for each money transfer transaction that was completed successfully (e.g., the funds of the money transfer transaction, whether staged or on-demand, were received by the receiving party), as well as entries for each money transfer transaction that was not completed successfully (e.g., money transfer transactions where the funds were not received or picked up by the receiving party, money transfer transactions that were not able to be completed because the sender provided incorrect information, money transfer transactions that were not executed because the amount of funds provided to fund the money transfer transaction were insufficient or less than the send amount, and the like). Additional aspects of the transaction log 146 are described in more detail below.

The GUI information 148 may store information associated with one or more GUIs that may be presented at one or more of the devices illustrated in FIG. 1 to facilitate the provisioning of the money transfer services to the users. For example, the GUI information 148 may include information associated with a GUI that may be presented to a user via the sending party device 170 or the receiving party device 160, such as via web page displayed in a web browser executing on the user device, or may include information associated with an application that may be installed on the user device to facilitate interaction between the user and the system 100 via the user's device in connection with the money transfer transaction services provided by the system 100. As another example, the GUI information 148 may include one or more GUIs that may be presented by the kiosk 110 or the agent device 120 to provide the money transfer transaction services to the user. Additional aspects of the GUI information 148 are described in more detail below.

It is noted that although FIG. 1 illustrates the system 100 as including the kiosk 110, the agent device 120, the central server 130, and the database 140, embodiments of system 100 according to the present disclosure may include additional kiosks, agent devices, central servers, databases, or a combination thereof, and are not to be limited to the specific number and arrangement of devices illustrated in FIG. 1. For example, an entity operating the system 100 may operate multiple central servers and/or databases for various purposes (e.g., to facilitate better response times, load balancing, regulatory compliance, auditing, etc.). As another example, the entity may operate and/or have a presence within numerous brick and mortar locations, each of which may include one or more agent devices and/or kiosks. The various locations where the entity operates or has a presence may be geographically disparate with respect to one another, which may include multiple locations distributed across a metropolitan area (e.g., multiple locations within a city), multiple locations distributed across a region (e.g., multiple locations across various cities within a state), and/or multiple locations distributed across another geographic area (e.g., multiple locations across multiple states, countries, and the like).

The system 100 may be configured to provide various money transfer transaction services to users. A first type of money transfer transaction servicer may provide on-demand money transfer transaction services to users. For example, the on-demand type money transfer transaction may be provided when a user desiring to make a money transfer transaction visits a money transfer location operating within the system 100, such as a money transfer location associated with the agent device 120, and initiates a money transfer transaction between the user and a receiving party. A second type of money transfer transaction may provide staged money transfer transaction services to users, where the staged money transfer transaction services enable the user to setup money transfer transaction in advance, and then fund the money transfer transaction at a later time. For example, a user may use an electronic device (e.g., the kiosk 110 or the user's laptop computing device, tablet computing device, personal computing device, smartphone, PDA, and the like) to setup or "stage" the money transfer transaction, and then fund the money transfer transaction at a later point in time. The staged money transfer transaction may be funded by visiting an agent location, such as a location associated with the agent device 120, or by visiting another location, such as a location associated with the kiosk 110) and providing an amount of funds to a money transfer agent or the kiosk 110, authorizing the money transfer service provider to charge an amount of funds to a financial card of the user, or authorizing withdrawal of an amount of funds from a financial account (e.g., a bank account) of the user. In an embodiment, the financial card or financial account used to fund the staged money transfer transaction may be identified during the staging of the money transfer transaction, as described in more detail below.

In an embodiment, the staged money transfer transactions may be recurring money transfer transactions. For example, the staged money transfer transactions may be utilized to make periodic payments (e.g., a loan payment, a rent payment, etc.) or to periodically disburse funds to a receiving party (e.g., a college student, a family member, etc.). In an embodiment, the staged money transfer transactions may be funded by a single sender. In an additional or alternative embodiment, the staged money transfer transactions may enable at least two senders to provide an amount of funds for funding the money transfer transactions. Additional aspects of embodiments for providing staged money transfer transactions and services are described below.

As explained briefly above, the system 100 may provide various GUIs to users and/or money transfer agents in connection with providing the money transfer transaction services. The GUIs may enable a user to create a profile or account for utilizing the money transfer transaction services. For example, a new user desiring to utilize the money transfer transaction services may access one of the GUIs, such as by navigating a web browser of the user device(s) 170 to a web page provided by a money transfer service provider operating the system 100 or by installing an application on a mobile communication device (e.g., a smartphone, tablet computing device, and the like) of the user, and creating a profile with the money transfer service provider. The profile, once created, may be stored at the database 140 as part of the profile information 142. In an embodiment, the profile may be associated with a single user. In an additional or alternative embodiment, the profile may be associated with a group of at least two users. Once the profile has been created, the user or group of at least two users may be authorized to participate in money transfer transactions using the money transfer transaction services provided by the system 100, as described in more detail below. In an embodiment, a profile may designate the user or a particular user of the group of at least two users as an administrator for the profile. The administrator for the profile may be authorized to provide information to the system 100 in connection with various aspects of the money transfer services provided by the system 100, as described in more detail below.

Each profile may include information that identifies the name, residential address, business address, e-mail address, telephone number(s), occupation, other information, or a combination thereof, for each user associated with the profile. In an embodiment, the profile may also include, for each user associated with the profile, financial account information (e.g., bank account number, routing number, the name of the bank, the type of bank account, etc.), financial card information (e.g., card issuer, card number, card verification value (CVV), expiration date, name on the card, etc.), or other information identifying sources that may be used to provide funds for funding money transfer transaction. In an embodiment, a profile may be created for a business, and the bank account information may correspond to an account that the business has authorized for receiving payments from the business' customers, as described in more detail below. By storing the funding source information as part of the profile, money transfer transactions may be executed between two entities (e.g., a sending party comprising one or more users associated with a first profile and a receiving party comprising one or more users associated with a second profile) without either party being aware of the funding source information of the other party, as described in more detail below. It is noted that other types of account information may be stored in association with one or more profiles, such as financial card information (e.g., reloadable prepaid card information, preferred money transfer agent location for picking up or providing transferred funds using cash, and the like) or other information that may be used to provide or receive funds in connection with money transfer transactions facilitated by the system 100.

Money transfer transactions provided by the system 100 may be utilized for various purposes according to embodiments. For example, a money transfer transaction may be initiated to provide a money transfer transaction between a sending party and a receiving party, where the sending party is a single user and the receiving party is a single user, and where the money transfer transaction enables the sending party to send funds to the receiving party. As another example, a money transfer transaction may be initiated between a sending party and a receiving party to provide a bill payment. In an embodiment, the sending party may include one or more users associated with a single profile and the receiving party may include a business entity. This type of money transfer transaction may be particularly suitable for many special types of payments. For example, a profile may be created for a group of family members, and then that profile may be used to initiate money transfer transactions to provide payment for one or more bills that the family members are jointly responsible for, such as making payments on a boat shared by two or more family members, or allowing the different family members to contribute to the payment of nursing home costs for an elderly member of the family, where the nursing home is the receiving party to the money transfer transactions. As another example, a group of family members may create a family profile and use that family profile to make payments on a mortgage for a vacation home that the family members share by contributing funds to a money transfer transaction that transfers funds to a financial institution associated with the mortgage. By allowing a group of users to establish a single profile that may be used to initiate money transfer transactions funded by members of the group of users, coordination of a shared payment, such as nursing home payments, payments on a shared boat or home, and the like, may be simplified. For example, previously, one of the family members would need to collect all of the funds from the other family members and then make the payment himself or herself, which could prove to be a hassle if many of the members of the family are in disparate geographic locations. Additional aspects of allowing at least two users to contribute an amount of funds to a money transfer transaction are described in more detail below.

When staged money transfer transactions are provided by the system 100, a user may provide staging information to the system 100. In an embodiment, the staging information may be provided using one or more of the GUIs provided by the system 100, such as the GUIs described above. In an embodiment, the staging information may be received at the kiosk 110, the agent device 120, the central server 130, or a combination thereof. In additional or alternative embodiments, the staging information may be received from the receiving party device(s) 160 and/or the sending party device(s) 170. Upon receiving the staging information, the staging information may be stored at the database 140 as part of the staging information 144.

In an embodiment, the staging information 144 may include scheduling information associated with a recurring money transfer transaction. The scheduling information may identify a frequency for the recurring money transfer transaction, a due date for the recurring money transfer transaction, and a lead time for sending a notification to a sender that is to provide funds for funding the recurring money transfer transaction. The frequency for the recurring money transfer transaction may be specified in terms of months (e.g., an instance of the recurring money transfer transaction takes place monthly, every three months, etc.), weeks (e.g., an instance of the recurring money transfer transaction takes place weekly, bi-weekly, etc.), days (e.g., an instance of the recurring money transfer transaction takes place every "X" number of days), or another configurable frequency or time period. In an embodiment, the receiving party may provide the scheduling information. For example, the receiving party may offer goods and/or services to an individual or group of individuals and may arrange to receive payment for the goods and/or services as a series of recurring payments (e.g., weekly payments, bi-weekly payments, monthly payments, or recurring payments made according to another time interval or frequency) made using the system 100. Upon determining the particular frequency and amount of the recurring payments, the receiving party may provide the scheduling information to the system 100, as described above. In an additional or alternative embodiment, the sending party may provide the scheduling information to the system 100. In still another additional or alternative embodiment, the sending party may provide a portion of the scheduling information and the receiving party may provide another portion of the scheduling information. For example, the receiving party may provide the due date information and information indicating that the money transfer transaction is a recurring money transfer transaction, and the sending party may provide information associated with the lead time(s). In still another additional or alternative embodiment, the system 100 may analyze various information provided to the system 100, such as the due date and various funding source preferences and may dynamically determine the lead time(s). For example, lead times may be dynamically determined for each individual sender of a group of senders based on the preferred funding source of each sender. In an embodiment, senders that prefer to fund the money transfer transaction by providing cash to a money transfer agent location may have shorter lead times than senders that prefer to use electronic funds transfers from a financial account or charges to a financial card for funding the money transfer transaction. Other factors that may affect the dynamically determined lead times may include the location of the senders (e.g., do any of the senders live at locations where there is not a money transfer agent location), funding history of each of the senders (e.g., has a particular sender consistently made funding payments on time or late—adjust lead time based on whether the sender is considered a timely sender or a late sender), and the like.

In an embodiment, the sending party may provide a code to the receiving party, where receiving party provides the code in connection with the scheduling information and the code indicates that the sending party has authorized the receiving party to setup the recurring money transfer transaction. For example, the sending party (e.g., the administrator of the sending party profile) may access a GUI provided by the system 100 and request an authorization code for a new recurring money transfer transaction. Upon receiving the authorization code, the sending party may provide the code to the receiving party, and the receiving party may provide the authorization code to the system 100 when providing the scheduling information. This may reduce the likelihood that a recurring money transfer transaction is setup within the system 100 in error. In an additional or alternative embodiment, the receiving party may request an authorization code from the system 100 and may provide the authorization code the sending party. The sending party may then setup the recurring payments to the receiving party by providing the authorization code the system 100. In an embodiment, when the sending party includes multiple senders, each sender may access the system 100 using the authorization code to provide their personal information, such as their name, address, contact information, payment source information and preferences, and the like. In an embodiment, each sender may have an individual profile with the system 100 (e.g., stored as part of the profile information 142 at the database 140), and may link their individual profiles to a multi-sender profile that is created in connection with a purchase (e.g., the purchase of the goods and/or services provided by the receiving party). Linking individual profiles in this manner may enable individual users of the system 100 to exert more control over which recurring money transfer transactions they are participating in as senders. For example, prior to being considered a sender for a recurring money transfer transaction, each of the senders must join the group profile (e.g., the profile created in association with the authorization code) by providing their individual authorization code to the system 100. This signifies that the sender acknowledges his/her assumption of at least partial financial responsibility to the group of senders and to the receiving party.

The due date information may indicate a particular day, week, month, etc. when the money transfer is to provide the funds to the receiving party. For example, when the recurring money transfer transaction is used to provide a mortgage payment for a vacation home shared between multiple users, the due date information may identify the due date as a particular day of the month, such as the fifth of every month (e.g., for recurring money transfer transactions having a monthly frequency). The due date may indicate that the receiving party (e.g., the mortgage company) expects to receive the mortgage payment via execution of the recurring money transfer transaction by the fifth of every month. It is noted that other due dates may be specified according to embodiments depending on the particular frequency for the recurring money transfer transaction or other factors. For example, the date upon which the funds are provided to or otherwise accessible to the receiving party may depend on the method in which the receiving party is to receive the funds from the recurring money transfer transaction. As another example, the date upon which the funds are provided to or otherwise accessible to the receiving party may depend on the method in which the sending party (which may include one or more senders) is to provide an amount of funds to fund the recurring money transfer transaction. In an embodiment, the lead time may be dynamically determined by the system 100, such as by the central server 130, based on the due date for the recurring money transfer transaction and/or the types of sources used to fund the money transfer transaction, as described in more detail below.

In an embodiment, the received staging information may further include information that identifies a preferred method for funding or receiving funds from the money transfer transaction and/or information indicating whether the money transfer transaction is a recurring money transfer transaction. For example, the staging information may indicate that the receiving party prefers to receive funds transferred via money transfer transactions (or recurring money transfer transactions) at a particular account (e.g., a bank account, a prepaid card account, or another type of account), in person by visiting a money transfer agent location, or via another technique or channel. Additionally, the staging information may indicate that a user prefers to provide an amount of funds for funding the money transfer transaction (or the recurring money transfer transaction) using a particular source of funds (e.g., an electronic funds transfer or charge to a bank account, a charge to a financial card, cash provided to a money transfer agent at a money transfer agent location, or another source of funds). In an additional or alternative embodiment, the preferred method for funding the money transfer transaction (or the recurring money transfer transaction) and/or the preferred method for receiving funds in connection with the money transfer transaction (or the recurring money transfer transaction) may be automatically determined based on the profiles of the sending and receiving party. In embodiments, the preferred method for funding money transfer transactions may be used to dynamically determine a lead time for generating notifications related to recurring money transfer transactions. For example, if the preference is to provide a cash payment to a money transfer agent location, the lead time may be shorter than when the money transfer transaction is to be funded using an electronic funds transfer from a financial account. In embodiments, the notification may be provided with at least a minimum lead time (e.g., one day, two days, etc.) irrespective of the preferred funding source. This may ensure that the sender(s) are notified of the pending payment with sufficient notice to obtain cash and visit a money transfer agent location for providing a cash payment to fund the money transfer transaction, or for ensuring that there are sufficient funds or credit available for providing the funding amount for the money transfer transaction from a financial account, a financial card account, and the like.

In embodiments where the sending party to the money transfer transaction (or the recurring money transfer transaction) includes at least two senders, the staging information may identify each of the at least two senders and may indicate an amount of funds to be provided by each of the at least two senders to fund the money transfer transaction (or the recurring money transfer transaction). In an embodiment, the amount of funds provided by each of the at least two senders may be configured by the administrator of the profile for the at least two senders. In an embodiment, each of the at least two senders may provide the same amount of funds. For example, suppose a money transfer transaction or recurring money transfer transaction has a funding amount of $100 and the sending party comprises N senders. In this example, each sender may be responsible for providing funds in the amount of $100/N, such that each of the N senders provides the same amount of funds (e.g., if N=2, each sender provides $50 to fund the money transfer transaction). In an additional or alternative embodiment, different senders of the at least two senders may provide a different amount of funds for funding the money transaction or the recurring money transfer transaction. For example, assuming that there are 2 senders in the sending party and the funding amount is $100, a first sender may provide $40 in connection with funding the money transfer transaction and a second sender may provide $60 in connection with funding the money transfer transaction.

In an embodiment, the administrator may configure the staging information to indicate an amount of funds provided by the first sender is to be provided using a first funding source, such as a financial account (e.g., a bank account, a financial card account, and the like) of the first sender or cash paid to a money transfer agent at a money transfer agent location (e.g., a money transfer agent location associated with the agent device 120) or another location where cash payments can be received (e.g., a location associated with the kiosk 110). The administrator may further configure the staging information to indicate that an amount of funds provided by the second sender are to be provided using a second funding source, such as a financial account (e.g., a bank account, a financial card account, and the like) of the second sender or cash paid to a money transfer agent at a money transfer agent location (e.g., a money transfer agent location associated with the agent device 120) or another location where cash payments can be received (e.g., a location associated with the kiosk 110). In embodiments, different senders may fund the money transfer transaction from different source types. For example, the first sender may provide a first amount of funds for funding the money transfer transaction using a first source type (e.g., a financial account source) and the second sender may provide a second amount of funds for funding the money transfer transaction using a second source (e.g., a cash payment source type or a financial card source type). In additional or alternative embodiments, the money transfer transaction may be funded by multiple senders where each of the multiple senders provides funds from the same source type. For example, a first sender may contribute a first amount of funds for funding the money transfer transaction using a first financial account source (e.g., a bank account of the first sender), and a second sender may contribute a second amount of funds for funding the money transfer transaction using a second financial account source (e.g., a bank account of the second sender). In some embodiments, rather than specifying the type of source from which a sender, or multiple senders, prefer to provide funds (e.g., for funding a money transfer transaction using the system 100) as part of the staging information, the type of source for one or more senders may be stored as preferences in a profile associated with the sending party (e.g., a profile associated with one or more users of the system 100).

In an embodiment, the amount of funds to be provided by each sender may be configured in response to a notification. For example, the notification (described in more detail below) may prompt the administrator to configure the funding of the money transfer transaction. The notification may include a link to a user interface (e.g., a web page or a GUI provided by an application installed on the user's electronic device (e.g., one of the sending party devices 170) that allows the administrator to configure the funding sources and amounts for each sender that is to contribute funds for funding the money transfer transaction. In an additional or alternative embodiment, the notification may prompt the administrator to designate the amount of funds that each sender is to contribute for funding the money transfer transaction, and then notifications sent to all non-administrator senders may include a link to a GUI that allows the non-administrator senders to designate a source for providing the designated amount of funds. This may allow each sender more control over the source from which they contribute funds, which may provide more flexibility to each of the senders individually. For example, different senders may be in different financial situations at any given point in time, and allowing the senders to configure the source may allow them to fund the money transfer transaction using a cash payment or a bank account when they are able to, but also allow them to fund a portion of the money transfer transaction using a financial card if they do not have cash readily available (e.g., in their bank account or elsewhere) for contributing to the money transfer transaction.

The staging information may further include a transaction amount. In an embodiment, the transaction amount may include a first amount corresponding to the amount of funds to be provided to the receiving party via the money transfer transaction, and a second amount corresponding to a transaction fee charged by an operator of the system 100 for facilitating the money transfer transaction. In an additional or alternative embodiment, the transaction amount may not include a transaction fee.

During operation, the system 100 may periodically analyze the staging information 144 stored at the database 140 to identify scheduled money transfer transactions (e.g., staged money transfer transactions). In an embodiment, the periodic analysis performed by the system 100 may include periodically analyzing the scheduling information to determine, based on the lead time and the due date for one or more recurring money transfer transactions identified in the scheduling information, whether to generate and transmit one or more notifications to sending parties associated with each of the one or more recurring money transfer transactions. In an embodiment, the periodic analysis may identified scheduled/staged money transfer transactions based on due date information associated with the recurring money transfer transactions, based on lead time information associated with recurring money transfer transactions, or a combination thereof.

In an embodiment, the periodic analysis may be performed by the central server 130. In an additional or alternative embodiment, the periodic analysis may be performed, at least in part, by one or more agent devices, such as the agent device 120. For example, agent devices may periodically analyze the staging information 144 and/or the scheduling information for scheduled/staged money transfer transactions associated with at least one sending party that is geographically proximate to a geographic area (e.g., within the same zip code, city, state, etc.) where the agent device is located. Performing the periodic analysis at the central server 130 may be more efficient because of the centralized processing provided by the central server 130 and may allow all resources of the agent devices to be used for providing services to users. However, performing the analysis at the agent devices may provide a greater level of customer service to the users. For example, an operator of an agent location of the agent device 120 may review the results of the analysis and provide customization of notifications based on information that the operator has obtained over period of time during which the operator has served one or more senders associated with scheduled/staged money transfer transactions. For example, the operator may customize greetings or other aspects of notifications based on prior personal interactions that the operator has had with particular senders. In an embodiment, one of the GUIs provided by the system 100 may provide an interface that enables the operator to review and edit notifications prior to the notifications being sent, as described in more detail below. In an embodiment, the periodic analysis may be scheduled to run during a period of time when the system 100 is not heavily used to provide the money transfer transaction services to its users. For example, the periodic analysis may be performed overnight.

In response to performing the periodic analysis, the system 100 may initiate generation of one or more notifications for each scheduled/staged money transfer transaction. After generating the notifications, and possibly customizing one or more of the notifications, as described above, the notifications may be transmitted to the senders associated with each transaction. In an embodiment, the notifications may be generated and transmitted as e-mail messages, text messages, multimedia messaging system (MMS) messages, automated voice response (AVR) system messages, letters to be sent by mail, push notifications (e.g., messages pushed to an application installed on one of the sending party devices 170), or a combination thereof. In an embodiment, the profile information 142 may include notification preference information for each sender, and the notifications may be generated based on the notification preference information. For example, if a particular sender's profile indicates a preference to receive notifications via text messaging, any notifications generated and transmitted to the particular sender may be generated as text messages that are sent to the particular sender's electronic device (e.g., a mobile communication device, a tablet computing device, etc.).

In an embodiment, the notifications may also include information that indicates the due date for completing the money transfer transaction, information suggesting a date when the recipient of the notification should provide funds for funding at least a portion of the money transfer transaction, an amount of funds to be provided by the recipient for funding at least the portion of the money transfer transaction (e.g., based on the staging information 144), a funding source (e.g., an electronic funds transfer from a financial account, a charge to a financial card, a cash payment at a money transfer agent location, etc.) identified by the staging information 144 designated for the sender to provide the amount of funds, a suggested money transfer agent location where the recipient can provide the amount of funds or obtain additional information regarding the notification, contact information for the suggested money transfer agent location, locate an alternative money transfer agent location (e.g., if the recipient is travelling or otherwise not able to utilize the suggested money transfer agent location), a link to a web page or application GUI where the recipient can alter a method for providing the funds (e.g., to switch from charging an amount to a financial card to fund the portion of the money transfer transaction to providing cash payment at the suggested money transfer location, or another alteration of the method for providing the funds), other information, or a combination thereof.

In an embodiment, notifications associated with recurring money transfer transactions may include an identifier corresponding to an instance of the recurring money transfer transaction. For example, the identifier may indicate that the notification corresponds to the July recurrence of the recurring money transfer transaction. In an embodiment, the identifier may further correspond to a particular sender of a group of at least two senders that are to provide funds in connection with funding the money transfer transaction. For example, where the recurring money transfer transaction is associated with a sending party that comprises two senders, the notification sent to the first sender may include a first identifier, such as a barcode, an alphanumeric code, and the like, that is associated with the first sender, and the notification sent to the second sender may include a second identifier, such as a barcode, an alphanumeric code, and the like. Both the first and second identifiers may include information identifying the particular instance of the recurring money transfer transaction (e.g., the Jul. 2016 instance of the recurring money transfer transaction), but the first and second identifiers may further be used to indicate when funds for funding the particular instance of the recurring money transfer transaction are received from the first and second senders. For example, the first sender may provide the first identifier to the system 100 at the time he/she provides funds for funding a first portion of the particular instance of the recurring money transfer transaction, and the second sender may provide the second identifier to the system 100 at the time he/she provides funds for funding a second portion of the particular instance of the recurring money transfer transaction. The first and second identifiers may be used to indicate that funds received in connection with funding the particular instance of the recurring money transfer transaction have been provided by the various senders of the group of senders that are to provide funds, as indicated by the staging information 144.

In an embodiment, the system 100 may create an entry in the transaction log 146 for each identified scheduled/staged money transfer transactions for which a notification is to be generated. As funds are received from senders, information received in connection with providing the funds, such as the identifiers described above, may be used to update the corresponding entry in the transaction log 146 to indicate that particular senders have contributed funds to the scheduled money transfer transaction.

In an embodiment, the transaction log 146 may be periodically analyzed to identify a first set of scheduled money transfer transactions corresponding to transactions for which the transaction amount has been received in full, and a second set of scheduled money transfer transactions corresponding to transactions for which the transaction amount has not been received in full (e.g., at least one sender has not contributed his/her portion of the transaction amount). In an embodiment, this analysis may include determining an amount of funds received from each sender to fund the money transfer transaction based on the information stored in the transaction log 146, and verifying whether the amount of funds received from the senders is greater than or equal to the transaction amount.

In response to a verification that the amount of funds received from the at least two senders is greater than or equal to the transaction amount have been received from the at least two senders, the money transfer transaction is initiated to provide at least a portion of the transaction amount to the receiving party. The verification of whether the funds are greater than or equal to the transaction amount may include determining an amount of funds received from each senders based on the information stored in the transaction log 146, and aggregating the amount of funds received from each of the senders to determine an aggregate amount of funds received from the senders for a particular money transfer transaction. The system 100 may then determine whether the aggregate amount of funds is greater than or equal to the transaction amount (e.g., the amount of funds to be provided to the receiving party plus the transaction fee, if any).

The system 100 may take further action based on the money transfer transactions associated with the first and second sets of money transfer transactions. If the due date for a scheduled money transfer transaction is approaching and all funds for funding the money transfer transaction have not been received, the system 100 may identify particular senders that have not contributed funds for funding the money transfer transaction, and may determine funding sources that the particular senders may use to provide funds to completely fund the scheduled money transfer transaction with sufficient time to enable the funds to be provided to the receiving party by the due date. For example, if the due date is one day away, there may be insufficient time for a sender to provide funds via an electronic funds transfer from a financial account of the sender. In such instances, the system 100 may generate and transmit a second notification to the sender indicating that the sender needs to provide an amount of funds as a cash payment at a money transfer agent location to ensure that the receiving party receives the funds by the due date. If other sources for funding the money transfer transaction would enable the funds to be received by the receiving party by the due date, the second notification may further identify those other sources to the sender.

If the system 100 determines that there is at least one scheduled money transfer transaction included in the first set of money transfer transactions (e.g., at least one scheduled money transfer transaction for which all funds have been received), the system 100 may initiate operations to provide the funds to the receiving party. In an embodiment, the operations to provide the funds to the receiving party may vary depending on the receiving party's preferences for receiving funds from the system 100. For example, as explained above, the staging information 144 and/or the profile information 142 may include preference information that identifies a preferred method for receiving funds from money transfer transactions performed using the system 100. When the receiving party's preferences indicate that the receiving party prefers to receive funds via a deposit into the receiving party's financial account (e.g., a bank account), the system 100 may initiate a real-time transfer of funds into the receiving party's financial account. In an embodiment, the real-time transfer of the funds into the receiving party's financial account may be provided by transferring the funds from a financial account of the operator of the system 100, where the financial accounts of the receiving party and the operator of the system 100 are financial accounts at the same financial entity (e.g., the same bank). When the receiving party's preferences indicate that receiving party prefers to pick up the payment as cash at a money transfer agent location and all funds for the money transfer transaction have been received from the one or more senders, the system 100 may generate a notification to the receiving party on the due date (or whenever the money transfer transaction is fully funded) indicating that the funds are available for pickup by the receiving party. In an embodiment, the notification transmitted to the receiving party may include an identifier or code, such as a barcode, an alphanumeric code, and the like, that may be presented by the receiving party at a money transfer agent location where the receiving party is picking up the funds of the money transfer transaction. In an embodiment, the notifications transmitted to the receiving party may be generated and transmitted as e-mail messages, text messages, MMS messages, AVR system messages, push notifications (e.g., messages pushed to an application installed on one of the receiving party devices 160), or a combination thereof. In an embodiment, the system 100 may provide a confirmation message to each sender that the receiving party has received the payment once the funds have been provided to the receiving party. The confirmation message may serve as proof that the payment to the receiving party has been made. In an embodiment, the transaction log 146 may be updated to indicate that receiving party has received the funds of the money transfer transaction, and may serve as a tool for auditing payment history for recurring money transfer transactions between a sending party (which may include one or more senders) and a receiving party.

The operations of the system 100 described above may provide an improved system for performing many types of transactions, particularly transactions where at least two persons or entities contribute funds for a payment. For example, the system 100 may provide an improved system for allowing members of a family to contribute funds for making mortgage payments on a vacation home or investment home shared by the members of the family. Each member of the family may set up a profile, or a group profile, as described above, and may provide information regarding an amount of funds to be contributed by each member of the family towards a recurring money transfer transaction used to make the mortgage payment, and the system 100 may then periodically notify the members of the family of an instance of the recurring money transfer transaction (e.g., a particular monthly mortgage payment). Each member of the family may then configure the source used to fund their respective portions of the instance of the recurring money transfer transaction, and once the full transaction amount has been received, the funds may be provided to the receiving party (e.g., the mortgage company) via the recurring money transfer transaction, as described above.

As another example, suppose that an elderly member of a family is placed in a nursing home or assisted living center, and the elderly family member's children are to pay the cost, or at least share in payment of the cost, for the nursing home or assisted living center. Each member of the family may set up a profile, or a group profile, as described above, and may provide information regarding an amount of funds to be contributed by each member of the family towards a recurring money transfer transaction used to pay for the elderly family member's care at the nursing home or assisted living center. The system 100 may then periodically notify the members of the family of an instance of the recurring money transfer transaction (e.g., a periodic payment for the elderly family member's care at the nursing home or assisted living center), and each member of the family may then configure the source used to fund their respective portions of the instance of the recurring money transfer transaction, as described above. Once the full transaction amount has been received, the funds may be provided to the receiving party (e.g., the nursing home or assisted living center) via the recurring money transfer transaction, as described above. Other examples include payment of medical care costs, daycare costs, group activities (e.g., sports teams or athletic clubs), child support and/or alimony payments, and the like.

It is noted that although aspects of FIG. 1 have been described with reference to funding money transfer transactions with funds from multiple senders, in some embodiments, money transfer transactions may be funded by one or more senders, and the receiving party may comprise two or more receivers. For example, if a family has two children attending college, the children's parents may schedule or stage money transfer transactions (e.g., one time money transfer transactions or recurring money transfer transactions) to pay for their children's tuition and/or living expenses, and may provide a single payment of funds to a money transfer entity operating the system 100, and then the system 100 may provide the funds to the appropriate receiving parties automatically using the techniques described above. For example, the system 100 may provide portions of the funding amount to the respective colleges to pay for each child's tuition, meal plan, and/or dorm accommodations, and may also provide portions of the funding amount to each child individually, such as to provide funds for living expenses, books, gas, or other expenses. Further, it is noted that recurring payments made using money transfer transactions provided by the system 100 may include fixed payment amount transactions, such as auto loan payments, student loan payments, or other types of payments having a fixed periodic payment amount, and/or may include variable periodic payment amounts, such as payments associated with utility bills (e.g., phone bills, electric bills, water bills, etc.) or payments to merchants that do not provide electronic payment options. In such embodiments, the receiving party may provide the staging information (e.g., information indicating the amount due, the due date, the account number of the account for which payment is requested, and other information), and the sender may provide account information (e.g., the account number associated with the sender's account with the utility provider) in connection with providing funds for funding the money transfer transaction. The account information may be matched with the account number provided by the receiving party to verify that the funds provided by the sending party are paid to the correct receiving party.

Further, the system 100 illustrated in FIG. 1 provides several advantages to underbanked consumers. In particular, the system 100 provides a consistent and secure technique for allowing underbanked consumers to request payment from a third party user of the system 100 and to pay bills electronically. For example, to request payment, a user may provide staging information to the system 100, as described above, and may identify one or more senders associated with the staging information. This may allow startup businesses to offer a more diverse number of payment options than they would otherwise be able to provide. For example, a startup business may not be able to set up merchant services to accept credit card payments (e.g., does not have money to invest in the appropriate merchant service equipment, etc.). Using the system 100, the startup business could allow its customers a variety of payment options (e.g., any payment option that can be used to provide funds to the money transfer service provider) without being required to invest in any specialized equipment (e.g., credit card readers, etc.).

In some embodiments, the operations of the system 100 may reduce the burden imposed on users that are making payments. For example, in embodiments where the receiving party stages the money transfer transaction, the burden is on the receiving party to request payment via a money transfer transaction by providing staging information to the system 100, rather than requiring the sending party to configure the arrangements for making payments to the receiving party. Additionally, embodiments of the system 100 improve security of payments by hiding each party's financial information (e.g., information identifying the sources used to fund the money transfer transaction and information identifying the destination for the funds of the money transfer transaction) from the other parties to the money transfer transaction. For example, the receiving party may provide its financial account or other information for receiving funds in connection with the money transfer transaction to the system 100, rather than to the sending party, and vice-versa. Thus, neither the sending party, nor the receiving party, needs to be aware of any financial accounts or other information of the other party in order to participate in the money transfer transaction.

Figure 2:
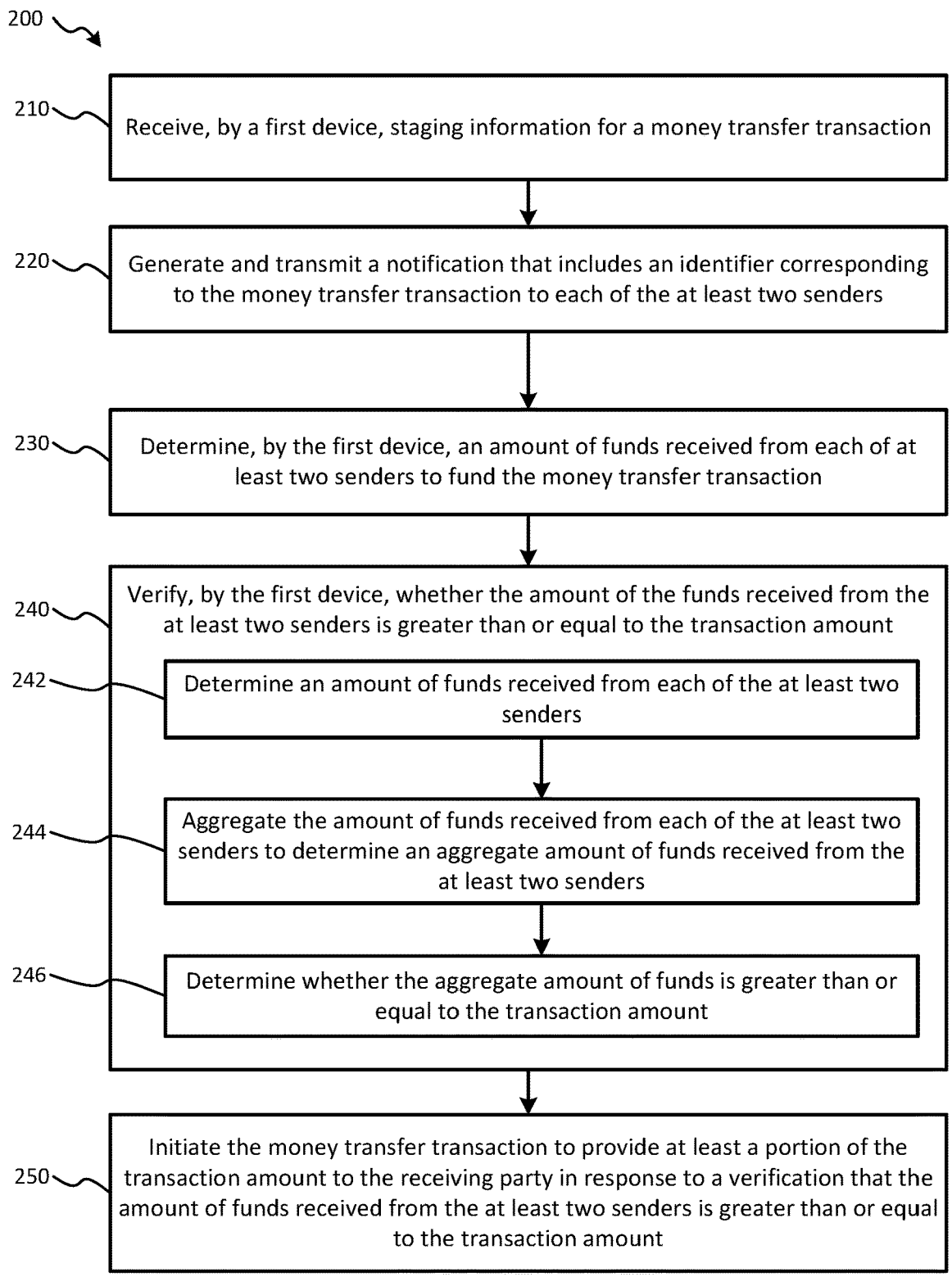
FIG. 2 a flow diagram of an embodiment of a method for providing a money transfer transaction.

Referring to FIG. 2, a flow diagram of an embodiment of a method for providing a money transfer transaction is shown as a method 200. In an embodiment, the method 200 may be performed by the agent device 120 of FIG. 1. In an additional or alternative embodiment, the method 200 may be performed by the central server 130 of FIG. 1. In another additional or alternative embodiment, the method 200 may be performed, at least in part, by an application installed on one of the one or more receiving party devices 160 of FIG. 1. In another additional or alternative embodiment, the method 200 may be performed, at least in part, by an application installed on one of the one or more sending party devices 170 of FIG. 1. In embodiments, the method 200 may be stored as instructions that are executable by one or more processors to perform the operations of the method 200.

At 210, the method 200 includes receiving, by a first device, staging information for a money transfer transaction. In an embodiment, the first device may be the kiosk 110 of FIG. 1. In an additional or alternative embodiment, the first device may be the agent device 120 of FIG. 1. In another additional or alternative embodiment, the first device may be the central server 130 of FIG. 1. The staging information may include information that identifies: at least two senders, a receiving party, and a transaction amount for a money transfer transaction. In an embodiment, the staging information may be received from a receiving party. In an additional or alternative embodiment, the staging information may be received from at least one of the at least two senders. In still another additional or alternative embodiment, a first portion of the staging information may be received from at least one of the at least two senders, and a second portion of the staging information may be received from the receiving party. In an embodiment, the staging information may be stored in a database, such as the database 140 of FIG. 1. When the money transfer transaction is a recurring money transfer transaction, the staging information may further comprise scheduling information. The scheduling information may identify a frequency for the recurring money transfer transaction, a due date for the recurring money transfer transaction, and a lead time for sending a notification to each of the at least two senders, as described above with reference to FIG. 1. In an embodiment, the staging information received at 210 may be received in response to one or more senders entering into a purchase agreement (e.g., a mortgage, a boat or automobile purchase, etc.) or some other financial arrangement or obligation (e.g., agreement to pay or assist with payment of rent at an apartment, nursing home, assisted living facility, university, a utility or other type of bill coming due, etc.) with the receiving party, as described above with reference to FIG. 1.

At 220, the method 200 includes generating and transmitting a notification that includes an identifier corresponding to the money transfer transaction. In an embodiment, the identifier may be the identifier describe above with reference to FIG. 1. The notification may be transmitted to each sender that is to contribute funds to the money transfer transaction, as described above with reference to FIG. 1. In an embodiment, the notification may be generated based, at least in part, on the staging information. For example, the staging information may include scheduling information that indicates a lead time for the money transfer transaction and a due date for the money transfer transaction, and the notification may be generated and transmitted based on the lead time and the due date for the money transfer transaction, as described above with reference to FIG. 1.

At 230, the method 200 includes determining, by the first device, an amount of funds received from the at least two senders to fund the money transfer transaction. In an embodiment, each of the at least two senders provides at least a portion of the funds. Depending on the particular configuration of the money transfer transaction, each of the at least two senders may provide a same amount of funds for funding the money transfer transaction, or may provide different amounts of funds for funding the money transfer transaction, as described above with reference to FIG. 1. At 240, the method 200 includes verifying, by the first device, whether the amount of the funds received from the at least two senders is greater than or equal to the transaction amount. As described with reference to FIG. 1, in an embodiment, verifying the amount of received funds may include, at 242, determining an amount of funds received from each of the at least two senders, and, at 244, aggregating the amount of funds received from each of the at least two senders to determine an aggregate amount of funds received from the at least two senders. At 246, the method 200 may include determining whether the aggregate amount of funds is greater than or equal to the transaction amount. By verifying that the aggregate (i.e., total) amount of funds received from all senders for the money transfer transaction is greater than or equal to the transaction amount (e.g., the amount of funds to be provided to the receiving party plus a transaction fee, if any), the method 200 ensures that the money transfer transaction is not executed until it can be completed in its entirety. This may prevent execution of partially funded money transfer transactions, which would result in the payment made to the receiving party via the money transfer transaction being less than the amount due to the receiving party, and may result in increased fees to the senders (e.g., late fees, service fees, etc.).

At 250, the method 200 includes initiating the money transfer transaction to provide at least a portion of the transaction amount to the receiving party in response to a verification that the amount of funds received from the at least two senders is greater than or equal to the transaction amount. In an embodiment, the portion of the transaction amount provided to the receiving party may be the amount due, as may be indicated in the staging information. In some embodiments, the receiving party may be charged a service fee by the money transfer service provider for administrating the payment, and the service fee may be deducted from the amount due. As described above with reference to FIG. 1, the funds may be provided to the receiving party via various channels, such as depositing the transferred funds in a financial account of the receiving party, as a cash payment provided to the receiving party at a money transfer agent location or kiosk, and the like. In embodiments, the particular channel used to provide the funds to the receiving party may be indicated in the staging information, or may be indicated in a profile associated with the receiving party, which may be stored at the database 140 of FIG. 1 as the profile information 142.

As shown above, the method 200 and system 100 improve money transfer systems and networks, and the devices operating within those networks by allowing multiple senders to contribute funds to a money transfer transaction, and then provide those funds to a receiving party (or two or more receivers, as described above). The ability to have multiple senders contribute funds also provides a technique for allowing money transfer transactions to be used in connection with new types of transactions for which money transfer transactions were previously not suitable, such as paying a mortgage payment on a vacation home shared by several persons, or allowing multiple roommates to pay utility bills. Money transfer transactions were previously not suitable for providing payment for such transactions because a single party to the money transfer transaction would act as the sending party, collecting funds from all of the other senders, and then make the payment himself or herself. Collecting the money from the other parties is a hassle, and does not allow the other parties to utilize various forms of payment to provide the funds. For example, the party collecting the funds would typically require payment of the funds from the other parties as cash, and then make the final payment using whatever technique was most convenient for the party that collected the funds. This means that only one sender ultimately had the ability to use a diverse array of payment methods for funding the money transfer transaction, while all other persons contributing funds to the money transfer transaction were limited to using cash or some other payment channel dictated by another person. The system 100 and method 200 may further improve the financial services provided to the underbanked community, such as by allowing them to request payments via staging money transfer transaction and allowing them to engage in multi-sender staged money transfer transactions that allow multiple senders to contribute funds towards a common payment without having a particular financial product or service (e.g., funds can be provided as cash, or from a financial account or financial card), whereas traditional techniques for providing electronic payments require specific financial products and services (e.g., a financial card or financial account from which payment is made).

Figure 3:
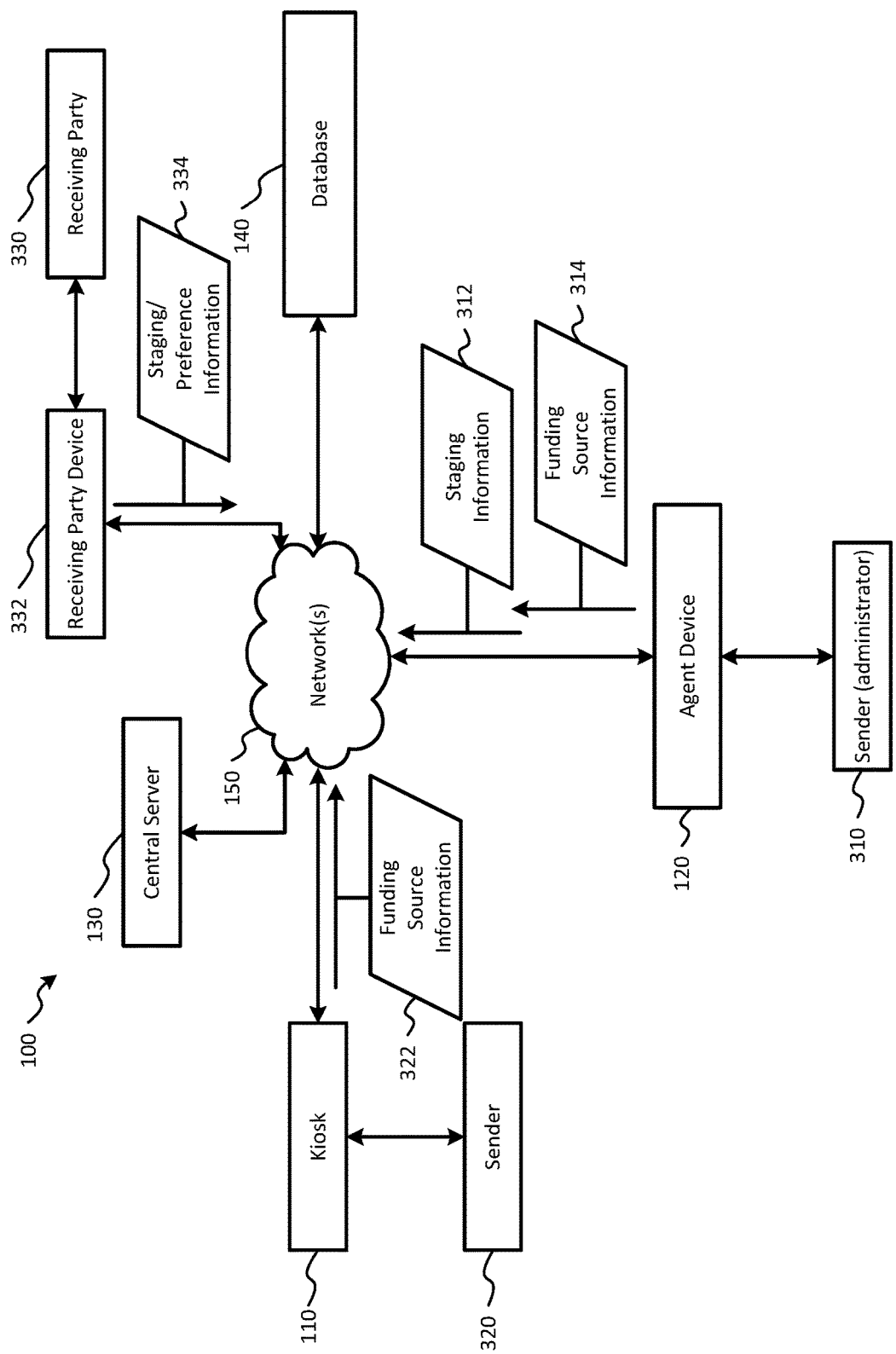
FIG. 3 is a block diagram illustrating various techniques for providing staging information associated with a money transfer transaction according to embodiments of the present disclosure.

Referring to FIGS. 3-6, various block diagrams illustrating aspects of providing money transfer transactions in a system configured according to embodiments of the present disclosure are shown. In FIGS. 3-6, the system 100 of FIG. 1 is shown. Additionally, a sending party is shown including a sender 310 (e.g., a member of the sending party designated as an administrator of the sending party) and a sender 320. As illustrated in FIG. 3, the members of the sending party may provide information to the system 100 via various techniques. For example, the sender 310 may use the agent device 120 to provide staging information 312 for a money transfer transaction between the sending party and a receiving party 330. In an embodiment, the staging information 312 may include the staging information described above with reference to FIG. 1 (e.g., the staging information 312 may indicate whether the sender 310 and the sender 320 are to provide the same amount of funds for funding the money transfer transaction or different amounts of funds, include scheduling information, and the like), and the staging information 312 may be stored at the database 140. Additionally, the sender 310 may utilize the agent device 120 to provide funding source information 314 to the system 100. The funding source information 314 may indicate the preferences of the sender 310 with respect to funding money transfer transactions (or portions thereof), such as whether the sender 310 prefers to make cash payments at a money transfer agent location, electronic funds transfer payments from a financial account of the sender 310, or another type of payment (e.g., financial card payment). The sender 320 may provide funding source information 322 to the system 100 via the kiosk 110, and the receiving party may provide staging/preference information 334 to the system 100 via a receiving party device 332 (e.g., a smartphone, a tablet computing device, a laptop computing device, a personal computer, a PDA, or another device of the receiving party 330). The funding source information 322 and the staging/preference information 334 may also be stored in the database 140.

Figure 4:
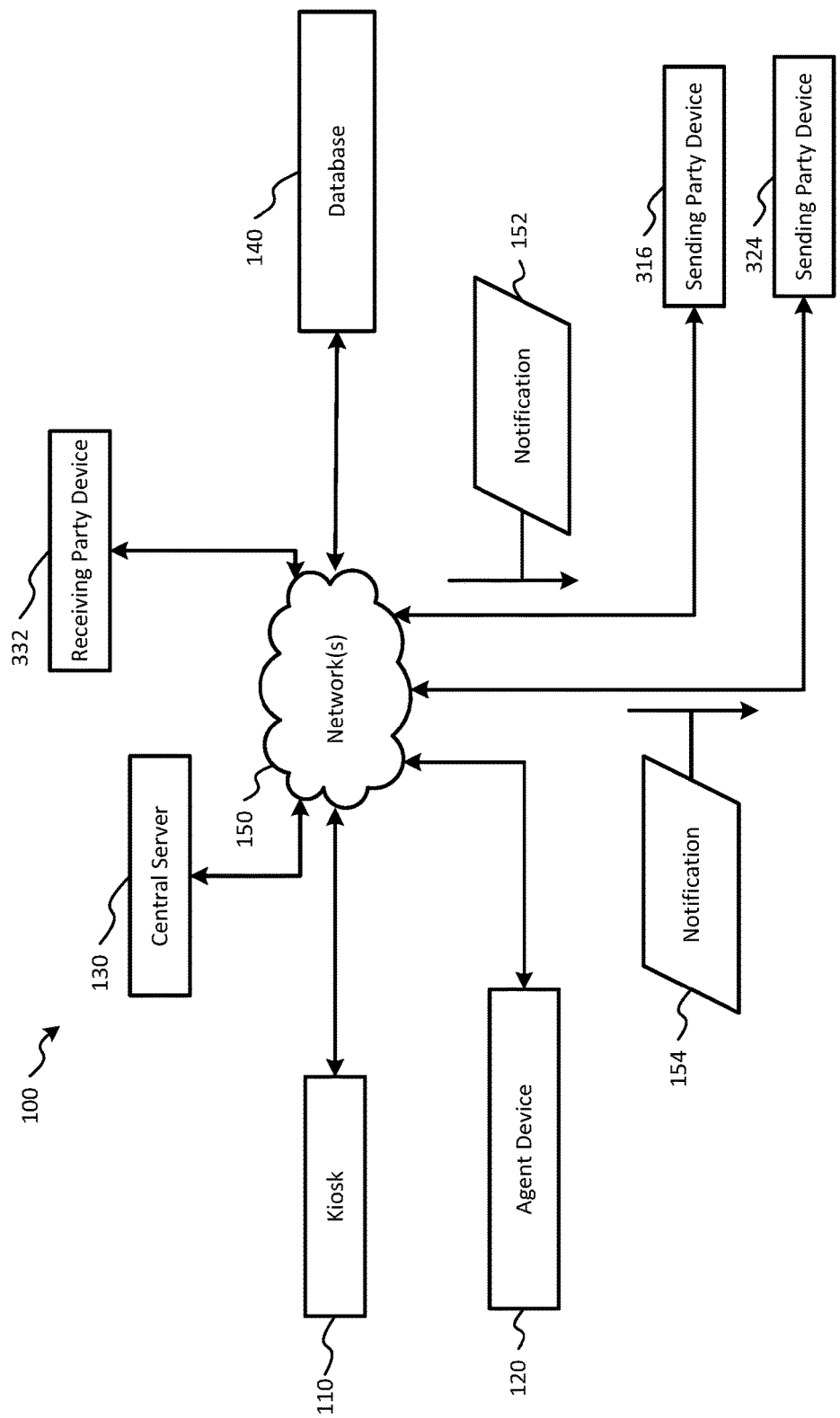
FIG. 4 is a block diagram illustrating various techniques for providing notifications to one or more sending party members associated with a staged money transfer transaction according to embodiments of the present disclosure.

As described above with reference to FIG. 1, the system 100 may periodically analyze the information stored in the database 140 to determine whether to generate and transmit one or more notifications to various parties. As illustrated in FIG. 4, upon analyzing the information stored at the database 140, the system 100 may determine to send a notification to each member of the sending party. For example, the system 100 may generate and transmit a notification 152 to the sender 310 via a sending party device 316 (e.g., a device of the sender 310), and may generate and transmit a notification 154 to the sender 320 via a sending party device 324 (e.g., a device of the sender 320). In an embodiment, as described above with reference to FIG. 1, the system 100 may determine the particular device and technique used to provide the notification to the various sending parties based on the information stored in the database 140. In an embodiment, the notification 152 may be a first notification type, such as an SMS message, and the notification 154 may be a second notification type, such as an e-mail notification, where the notification type of the respective notifications 152, 154 may be determined based on the information stored in the database 140. As described above with reference to FIG. 1, the notifications 152, 154 may prompt the sender 310 and the sender 320 to provide an amount of funds to the operator of the system 100 to fund the money transfer transaction. Upon receiving the notifications 152, 154, the sender 310 and the sender 320 may utilize various funding sources to provide an amount of funds for funding the money transfer transaction.

Figure 5:
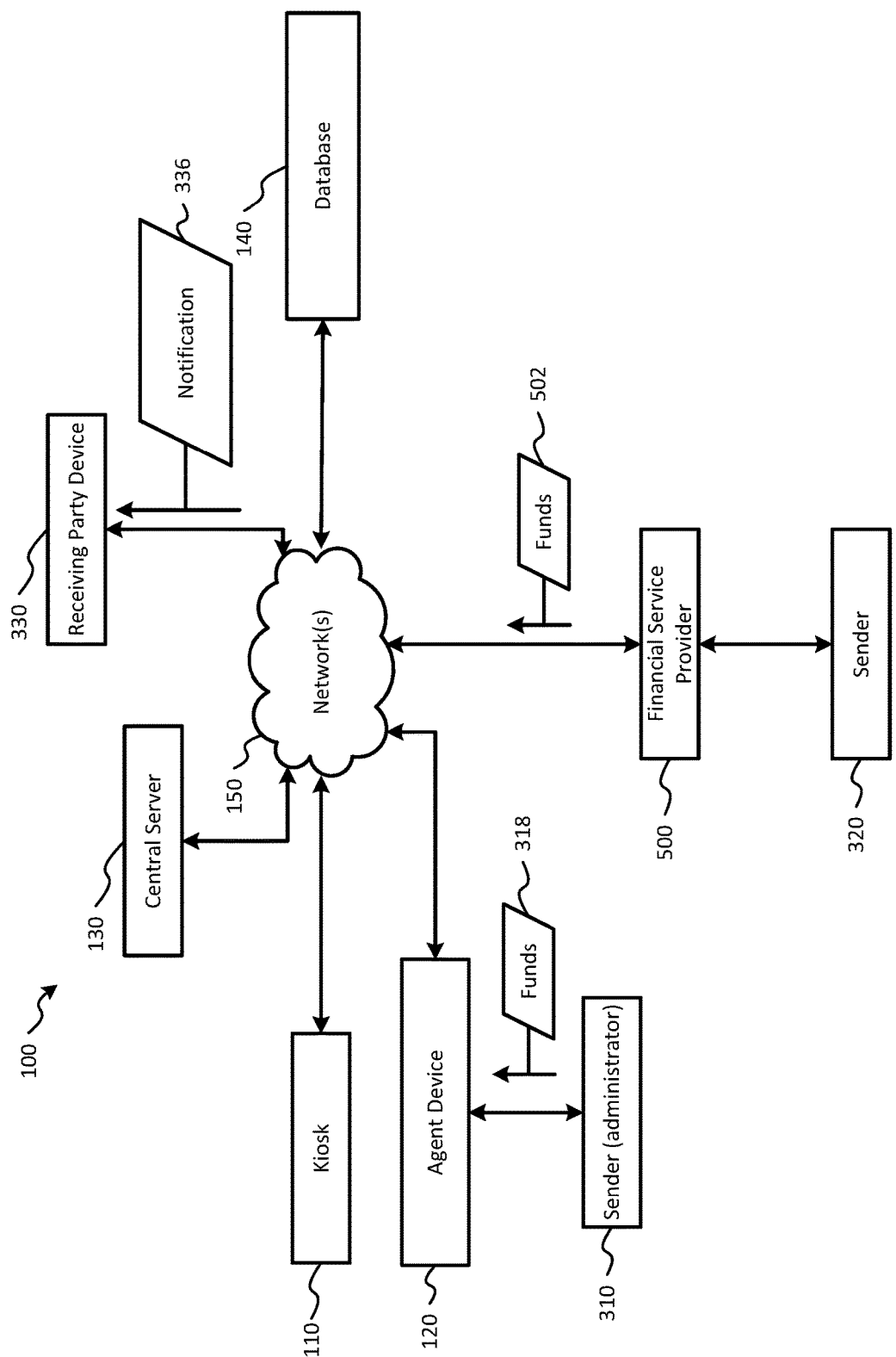
FIG. 5 is a block diagram illustrating aspects of providing funds from different funding sources to fund a money transfer transaction.

For example, referring to FIG. 5, a block diagram illustrating aspects of providing funds from different funding sources to fund a money transfer transaction is shown. As shown in FIG. 5, the sender 310 may provide funds 318 for funding the money transfer transaction by visiting a money transfer agent location associated with the agent device 120. The funds 318 may be provided via a cash payment, a charge to a financial card, or another funding source available at the money transfer agent location. Additionally, as shown in FIG. 5, the sender 320 may provide funds 502 for funding the money transfer transaction from an account (e.g., a bank account or another type of account) that the sender 320 has with a financial service provider 500 (e.g., a bank or another type of financial service provider). In an embodiment, the system 100 may automatically withdraw the funds 502 from the financial account of the sender 320. For example, the funding source information 322 provided by the sender 320 in FIG. 3 may include information that identifies the financial service provider 500 and the account of the sender 320 with the financial service provider 500. The funding source information 322 may further include an authorization to automatically charge an account to provide the funds 502 for funding the money transfer transaction. It is noted that other techniques for providing funds may be utilized to fund money transfer transactions provided by the system 100, as described above with reference to FIG. 1, and that the exemplary techniques for providing funds shown in FIG. 5 are provided for purposes of illustration, rather than by way of limitation.

Once the money transfer transaction has been funded (e.g., the system 100 has performed verification that the money transfer transaction has been funded, as described above with reference to FIGS. 1 and 2), the system 100 may generate a notification 336 that is provided to the receiving party 330 via the receiving party device 332. In an embodiment, the notification 336 may be provided as a text message, an MMS message, an e-mail, or another type of notification, as described with reference to FIG. 1, above. The type of the notification 336 may be determined based on the preferences of the receiving party 330, such as the staging/preference information 334 described above with reference to FIG. 3. The notification 336 may notify the receiving party 330 that the money transfer transaction has been funded and that the funds are available for pickup by the receiving party 330.

Figure 6:
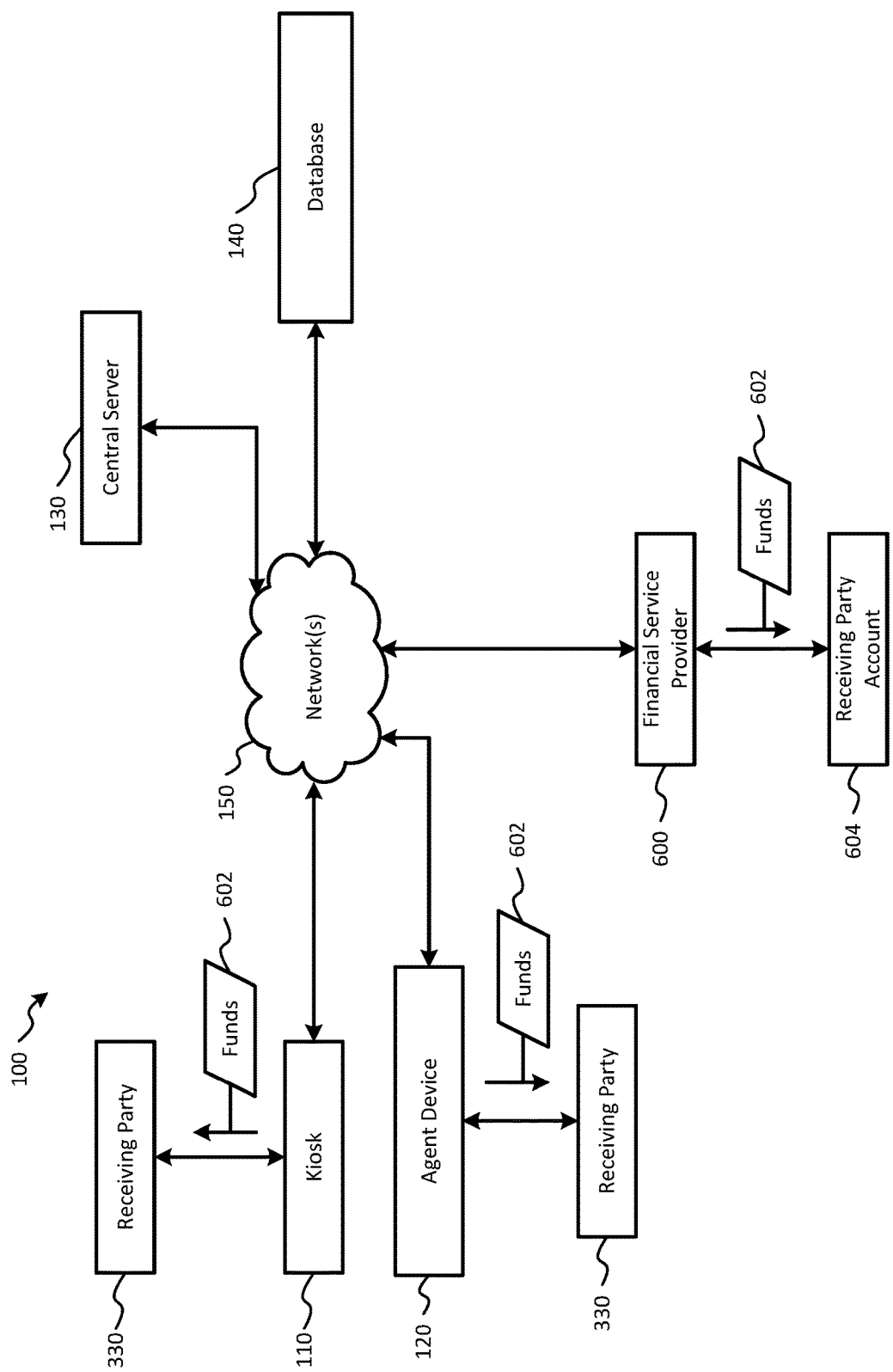
FIG. 6 is a block diagram illustrating various techniques for providing funds to a receiving party via a money transfer transaction according to embodiments of the present disclosure.

For example, FIG. 6 is a block diagram illustrating various techniques for providing funds to a receiving party via a money transfer transaction according to embodiments of the present disclosure. As shown in FIG. 6, upon receiving the notification 336, the receiving party 330 may visit the kiosk 110 to retrieve funds 602 corresponding to the funds transferred to the receiving party 330 via the money transfer transaction described above with reference to FIGS. 3-5. In an embodiment, the receiving party 330 may utilize information included in the notification 336 to retrieve the funds 602. For example, the notification 336 may include a code that may be input at the kiosk 110 to retrieve the funds 602. As another example, upon receiving the notification 336, the receiving party 330 may visit a money transfer agent location associated with the agent device 120 to retrieve the funds 602. In an embodiment, the receiving party 330 may utilize information included in the notification 336 to retrieve the funds 602. For example, the notification 336 may include a code that may be input at the agent device 120 to retrieve the funds 602. As yet another example, the funds 602 may be automatically deposited into an account 604 at a financial service provider 600, where the account 604 is associated the receiving party 330. In an embodiment, the particular technique utilized to provide the funds 602 to the receiving party 330 may be determined based on preference information provided to the system 100 by the receiving party, such as the staging/preference information 334 described above with reference to FIG. 3. It is noted that if the receiving party 330 of FIGS. 3-6 included multiple receivers, the funds received from the sender 310 and the sender 320 may be divided amongst the multiple receivers and provided to each of the multiple receivers based on configured amounts of funds that each receiver was supposed to receive from the executed money transfer transaction.

From the description of FIGS. 3-6 above, it has been shown that the system 100 facilitates money transfer transactions between a sending party and receiving party where one or more of the sending party and the receiving party include multiple users (e.g., multiple senders or multiple receivers). This provides a new technique for executing money transfer transactions that are suitable for various new types of payments. For example, if the sender 310 and the sender 320 were family members, the receiving party 330 may be a financial entity (e.g., a bank or another type of financial entity) that has given a loan to the sender 310 and the sender 320, such as a mortgage loan, an automobile loan, a boat loan, or another type of loan, and the funds provided via the money transfer transaction may be used to facilitate a monthly payment on the loan by the sender 310 and the sender 320. As another example, the receiving party 330 may include multiple receivers including a first college and a second college, and the senders 310, 320 may be family members who have children and/or grandchildren attending the first and second college. The funds transferred via the money transfer transaction may be provided to the first and second colleges to pay for tuition or other college related expenses. Such scenarios may prove beneficial in situations where the senders are in a different country than the receivers (e.g., because other techniques for transferring the funds, such as checks or wire transfers, may result in longer delays before the funds are received by the receiving party).

A further advantage of the system 100 is the ability to utilize fraud prevention systems and protocols implemented by the operator of the system 100 in its ordinary course of business. For example, money transfer service providers have sophisticated fraud prevention systems and personnel that are trained to recognize and mitigate suspected fraudulent transactions. Thus, providing payments via the system 100 may further reduce some instances of fraudulent activity, such as money laundering.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing a staged money transfer transaction service, the method comprising:
receiving, by a processor of a first computing device operating in a money transfer network, a request from a first user computing device of a first party to establish a first profile and a request from a second user computing device of a second party to establish a second profile, wherein the first computing device is communicatively coupled to the first user computing device and the second user computing device via a network;
storing, in a database accessible to the first computing device via the money transfer network, the first profile associated with the first party and the second profile associated with the second party, wherein the first profile includes first financial account information associated with a financial account of the first party, and wherein the second profile includes second financial account information associated with a financial account of the second party, wherein the first financial account information includes a first financial account and is utilized with respect to staged money transfer transactions of the first party and the second financial account information includes a second financial account and is utilized with respect to staged money transfer transactions of the second party;
receiving, by the first computing device and from the first party, the second party, or both, staging information for a money transfer transaction, wherein the staging information comprises: information that identifies at least two senders including the first party and the second party, information that identifies a receiving party, information identifying the receiving party, a transaction amount, and scheduling information for the money transfer transaction, the scheduling information including a frequency or a due date and a lead time for providing a notification to the first and second parties;
linking, by the first computing device and in the database, the first profile to the second profile by creating a multi-party profile associated with the staging information for the money transfer transaction requested by the first party, the second party, or both, wherein the multi-party profile excludes at least some of the first profile information, at least some of the second profile information, or a combination thereof, and wherein the linking includes generating an authorization code associated with the multi-party profile, the authorization code configured to provide access to the staged money transfer transaction or the multi-party profile by the first party and the second party;
determining, by the first computing device, an amount of funds received from at least the first party and the second party to fund the money transfer transaction, wherein each of the at least two senders provides at least a portion of the funds;
verifying, by the first computing device, whether the amount of the funds received from at least the first party and the second party is greater than or equal to the transaction amount; and
in response to a verification that the amount of funds received from at least the first party and the second party is greater than or equal to the transaction amount, automatically initiating the money transfer transaction to provide at least a portion of the transaction amount to a financial account of the receiving party.

2. The method of claim 1, wherein verifying whether the funds are greater than or equal to the transaction amount have been received from the at least two senders comprises:
determining an amount of funds received from each of the at least two senders;
aggregating the amount of funds received from each of the at least two senders to determine an aggregate amount of funds received from the at least two senders; and
determining whether the aggregate amount of funds is greater than or equal to the transaction amount.

3. The method of claim 2, wherein each of the at least two senders provides a same amount of funds.

4. The method of claim 2, wherein different senders of the at least two senders provide a different amount of funds.

5. The method of claim 1, wherein the multi-party profile identifies one or more sources for providing funds for each of the at least two senders.

6. The method of claim 1, wherein the receiving party provides a first portion of the staging information, and wherein the at least two senders provide a second portion of the staging information.

7. The method of claim 6, wherein the first portion of the staging information comprises information for providing at least the portion of the transaction amount to the receiving party, and wherein the second portion of the staging information comprises information identifying each of the at least two senders and one or more sources for providing funds for each of the at least two senders.

8. The method of claim 7, wherein a particular sender of the at least two senders is designated as an administrator, and wherein the second portion of the staging information is received from the administrator.

9. The method of claim 1, further comprising:
generating a notification that includes an identifier corresponding to the money transfer transaction;
transmitting the notification to each of the at least two senders;
receiving information associated with the identifier in connection with receiving an amount of funds from a particular sender of the at least two senders;
identifying the money transfer transaction based on the information associated with the identifier;
associating the particular amount of funds received from the particular sender with the money transfer transaction; and updating a transaction log to indicate the particular amount of funds received from the particular sender.

10. The method of claim 1, wherein the money transfer transaction is a recurring money transfer transaction, the method further comprising:
receiving scheduling information associated with the recurring money transfer transaction, the scheduling information identifying a frequency for the recurring money transfer transaction, a due date for the recurring money transfer transaction, and a lead time for sending a notification to each of the at least two senders;
storing the scheduling information at the database; and
periodically analyzing the scheduling information to determine, based on the lead time and the due date for the recurring money transfer transaction identified in the scheduling information, whether to generate and transmit the notification to each of the at least two senders.

11. The method of claim 1, further comprising receiving, by the first device and from the receiving party, a request to configure receiving party information, wherein the request includes second staging information, wherein the second staging information identifies the receiving party, frequency information indicating a frequency for reinitiating the money transfer transaction, and a payment amount associated with each occurrence of the money transfer transaction.

12. The method of claim 1, further comprising receiving, by the first device, payment account designation information from the first party and the second party, the payment account designation information identifying a first financial account indicated by the first party and a second financial account indicated by the second party, the first financial account identified in the first profile information of the first profile and the second financial account identified in the second profile information of the second profile.

13. The method of claim 12, wherein the multi-party profile enables the first party to control the first financial account and the second party to control the second financial account during funding of the money transfer transaction.

14. The method of claim 1, further comprising:
periodically analyzing, by the first device, payment account designation information and frequency information to determine a lead time for transmitting a notification to the first party and the second party, wherein the notification indicates an upcoming instance of the money transfer transaction, and wherein the lead time is determined such that the notification is transmitted at a time that allows sufficient time to process a payment of a funding amount from a first financial account and a second financial account prior to a next occurrence of the money transfer transaction; and
transmitting the notification to the first party and to the second party.

15. The method of claim 1, further comprising:
receiving, by the first device and from the first party, a first authorization code;
receiving, by the first device and from the second party, a second authorization code;
authorizing, by the first device, the first party based on the first authorization code and the second party based on the second authorization code, wherein the first profile is linked to the second profile in response to authorizing the first party and the second party;
receiving, from the receiving party, a third authorization code; and
authorizing the receiving party based on the third authorization code, wherein the money transfer transaction is initiated further in response to authorizing the receiving party based on the third authorization code.

16. The method of claim 15, wherein the first authorization code, the second authorization code, and the third authorization code link the first party, the second party, and the receiving party to the money transfer transaction, wherein the first authorization code enables the first party to access and to fund the money transfer transaction independently of the second party and without disclosure to the second party of the at least some of the first profile information, wherein the second authorization code enables the second party to access and to fund the money transfer transaction independently of the first party and without disclosure to the first party of the at least some of the second profile information, and wherein the third authorization code enables the receiving party to maintain control of financial information of the receiving party while receiving the funds.

17. A system for providing a staged money transfer transaction service, the system comprising:
a database; and
a first computing device communicatively coupled to the database, the first computing device comprising:
a memory; and
at least one processor configured to:
receive a request from a first user computing device of a first party to establish a first profile and a request from a second user computing device of a second party to establish a second profile, wherein the first computing device is communicatively coupled to the first user computing device and the second user computing device via a network;
store, in the database, the first profile associated with the first party and the second profile associated with the second party, wherein the first profile includes first financial account information associated with a financial account of the first party, and wherein the second profile includes second financial account information associated with a financial account of the second party, wherein the first financial account information includes a first financial account and is utilized with respect to staged money transfer transaction of the first party and the second financial account information includes a second financial account and is utilized with respect to staged money transfer transactions of the second party;
receive staging information for a money transfer transaction from the first party, the second party, or both, wherein the staging information comprises: information that identifies at least two senders including the first party and the second party, information that identifies a receiving party, information identifying the receiving party, a transaction amount, and scheduling information for the money transfer transaction, the scheduling information including a frequency or a due date and a lead time for providing a notification to the first and second parties;
link, in the database, the first profile to the second profile by creating a multi-party profile associated with the staging information for the money transfer transaction requested by the first party, the second party, or both, wherein the multi-party profile excludes at least some of the first profile information, at least some of the second profile information, or a combination thereof, and wherein the linking includes generating an authorization code associated with the multi-party profile, the authorization code configured to provide access to the staged money transfer transaction or the multi-party profile by the first party and the second party;
determine an amount of funds received from at least the first party and the second party to fund the money transfer transaction, wherein each of the at least two senders provides at least a portion of the funds;
verify whether the amount of the funds received from at least the first party and the second party is greater than or equal to the transaction amount; and
in response to a verification that the amount of funds received from at least the first party and the second party is greater than or equal to the transaction amount, automatically initiate the money transfer transaction to provide at least a portion of the transaction amount to a financial account of the receiving party.

18. The system of claim 17, wherein the at least one processor is further configured to:
initiate generation a notification that includes an identifier corresponding to the money transfer transaction, wherein the notification is transmitted to each of the the first party and the second party, wherein information associated with the identifier is received in connection with receiving an amount of funds from a particular one of the first party and the second party, wherein the money transfer transaction is identified based on the information associated with the identifier, wherein the particular amount of funds received from the particular sender is associated with the money transfer transaction based on the information associated with the identifier, and wherein a transaction log is updated to indicate the particular amount of funds received from the particular sender.

19. A non-transitory computer-readable medium storing instructions that, when executed by one or more processors, cause the one or more processors to perform operations for providing a staged money transfer transaction service, the operations comprising:
receiving a request, at a first computing device operating in a money transfer network, from a first user computing device of a first party to establish a first profile and a request from a second user computing device of a second party to establish a second profile, wherein the first computing device is communicatively coupled to the first user computing device and the second user computing device via a network;
storing, in a database accessible to the first computing device via the money transfer network, the first profile associated with the first party and the second profile associated with the second party, wherein the first profile includes first financial account information associated with a financial account of the first party, and wherein the second profile includes second financial account information associated with a financial account of the second party, wherein the first financial account information includes a first financial account and is utilized with respect to staged money transfer transaction of the first party and the second financial account information includes a second financial account and is utilized with respect to staged money transfer transactions of the second party;
receiving staging information for a money transfer transaction from the first party, the second party, or both, wherein the staging information comprises: information that identifies at least two senders including the first party and the second party, information that identifies a receiving party, information identifying the receiving party, a transaction amount, and scheduling information for the money transfer transaction, the scheduling information including a frequency or a due date and a lead time for providing a notification to the first and second parties;
linking, in the database, the first profile to the second profile by creating a multi-party profile associated with the staging information for the money transfer transaction requested by the first party, the second party, or both, wherein the multi-party profile excludes at least some of the first profile information, at least some of the second profile information, or a combination thereof, and wherein the linking includes generating an authorization code associated with the multi-party profile, the authorization code configured to provide access to the staged money transfer transaction or the multi-party profile by the first party and the second party;
determining an amount of funds received from at least the first party and the second party to fund the money transfer transaction, wherein each of the at least two senders provides at least a portion of the funds;
verifying whether the amount of the funds received from at least the first party and the second party is greater than or equal to the transaction amount; and
in response to a verification that the amount of funds received from at least the first party and the second party is greater than or equal to the transaction amount, automatically initiating the money transfer transaction to provide at least a portion of the transaction amount to a financial account of the receiving party.

20. The non-transitory computer-readable storage medium of claim 19, wherein the money transfer transaction is a recurring money transfer transaction, the operations further comprising:
storing the scheduling information at the database, wherein the lead time is configurable by an administrator of the multi-party profile, and wherein the administrator is one of the first party or the second party; and
periodically analyzing the scheduling information to determine, based on lead times and the due dates for recurring money transfer transactions, whether to generate and transmit notifications to one or more senders associated with the recurring money transfer transactions.

* * * * *